United States Patent
Sokolov et al.

(10) Patent No.: US 9,117,061 B1
(45) Date of Patent: Aug. 25, 2015

(54) TECHNIQUES FOR SECURING AUTHENTICATION CREDENTIALS ON A CLIENT DEVICE DURING SUBMISSION IN BROWSER-BASED CLOUD APPLICATIONS

(75) Inventors: Ilya Sokolov, Boston, MA (US); Andrew Chang, Somerville, MA (US)

(73) Assignee: Symantec Corporation, Mountain View, CA (US)

( * ) Notice: Subject to any disclaimer, the term of this patent is extended or adjusted under 35 U.S.C. 154(b) by 309 days.

(21) Appl. No.: 13/175,993

(22) Filed: Jul. 5, 2011

(51) Int. Cl.
*G06F 7/04* (2006.01)
*G06F 21/30* (2013.01)
*H04L 9/00* (2006.01)

(52) U.S. Cl.
CPC . *G06F 21/30* (2013.01); *H04L 9/00* (2013.01)

(58) Field of Classification Search
CPC .......... G06F 21/30; H04L 9/00; H04L 9/0813
USPC ........ 713/150–158, 183; 726/5–9, 2; 709/224
See application file for complete search history.

(56) References Cited

U.S. PATENT DOCUMENTS

| | | | | |
|---|---|---|---|---|
| 7,039,946 | B1 * | 5/2006 | Binding et al. | 726/3 |
| 8,117,648 | B2 * | 2/2012 | Slaton et al. | 726/6 |
| 8,261,334 | B2 * | 9/2012 | Hazlehurst et al. | 726/7 |
| 8,327,421 | B2 * | 12/2012 | Ting | 726/5 |
| 8,402,518 | B2 * | 3/2013 | Torres et al. | 726/5 |
| 8,484,701 | B2 * | 7/2013 | Murphy | 726/3 |
| 8,504,704 | B2 * | 8/2013 | Hardt | 709/229 |
| 8,667,560 | B2 * | 3/2014 | Albisu | 726/2 |
| 8,726,369 | B1 * | 5/2014 | Emigh | 726/18 |
| 8,806,201 | B2 * | 8/2014 | Kailash et al. | 713/168 |
| 2005/0144449 | A1 * | 6/2005 | Voice | 713/169 |
| 2006/0018467 | A1 * | 1/2006 | Steinmetz | 380/54 |
| 2007/0067830 | A1 * | 3/2007 | Kuo et al. | 726/5 |
| 2007/0283430 | A1 * | 12/2007 | Lai et al. | 726/15 |
| 2008/0115208 | A1 * | 5/2008 | Lee | 726/19 |
| 2009/0205036 | A1 * | 8/2009 | Slaton et al. | 726/9 |
| 2009/0288148 | A1 * | 11/2009 | Headley et al. | 726/5 |
| 2010/0017616 | A1 * | 1/2010 | Nichols et al. | 713/183 |
| 2010/0088698 | A1 * | 4/2010 | Krishnamurthy | 718/1 |
| 2010/0318802 | A1 * | 12/2010 | Balakrishnan | 713/172 |
| 2011/0154459 | A1 * | 6/2011 | Kuang et al. | 726/6 |
| 2011/0213956 | A1 * | 9/2011 | Mukkara et al. | 713/152 |
| 2012/0272056 | A1 * | 10/2012 | Ganesan | 713/156 |
| 2012/0303952 | A1 * | 11/2012 | Smith et al. | 713/158 |

OTHER PUBLICATIONS

Yasuhiko Matsunaga, Secure authentication system for public WLAN roaming, ACM—UC Berkeley, ACM 2003, pp. 113-121.*

* cited by examiner

*Primary Examiner* — Dede Zecher
*Assistant Examiner* — Viral Lakhia
(74) *Attorney, Agent, or Firm* — Wilmer Cutler Pickering Hale and Dorr LLP

(57) ABSTRACT

Techniques for securing authentication credentials on a client device during submission in browser-based cloud applications are disclosed. In one particular embodiment, the techniques may be realized as a method for securing authentication credentials on a client device comprising: detecting, on the client device, display of an authentication form in a browser window associated with a first flow to a target server; accessing, on the client device, one or more authentication credentials associated with a user of the client device; and submitting, to the target server, the one or more authentication credentials via a second flow to the target server.

20 Claims, 6 Drawing Sheets

TECHNIQUES FOR SECURING AUTHENTICATION CREDENTIALS ON A CLIENT DEVICE DURING SUBMISSION IN BROWSER-BASED CLOUD APPLICATIONS

FIELD OF THE DISCLOSURE

The present disclosure relates generally to securing authentication credentials and, more particularly, to techniques for securing authentication credentials on a client device during submission in browser-based cloud applications.

BACKGROUND OF THE DISCLOSURE

Most modern commercial software products allow online users to access applications (e.g., cloud applications) via web interfaces. Such online users typically access these web interfaces using a browser (e.g., web browser) operating on a client device (e.g., a personal computer). In many cases, access to the applications is granted after authentication credentials (e.g., username, password) are entered into an authentication home page. Unfortunately, various third party applications (e.g., key loggers, hooks) residing on a client device may surreptitiously gain access to these authentication credentials as an online user enters the authentication credentials into the authentication home page.

In view of the foregoing, it may be understood that there may be significant problems and shortcomings associated with authentication protection technologies.

SUMMARY OF THE DISCLOSURE

Techniques for securing authentication credentials on a client device during submission in browser-based cloud applications are disclosed. In one particular embodiment, the techniques may be realized as a method for securing authentication credentials on a client device comprising: detecting, on the client device, display of an authentication form in a browser window associated with a first flow to a target server; accessing, on the client device, one or more authentication credentials associated with a user of the client device; and submitting, to the target server, the one or more authentication credentials via a second flow to the target server.

In accordance with other aspects of this particular embodiment, the one or more authentication credentials may include at least one of a username and a password.

In accordance with further aspects of this particular embodiment, detecting display of the authentication form may include identifying one or more authentication fields within the authentication form.

In accordance with additional aspects of this particular embodiment, accessing the one or more authentication credentials may include accessing a pre-established password vault associated with the user.

In accordance with other aspects of this particular embodiment, accessing the one or more authentication credentials may include receiving the one or more authentication credentials via a secure window.

In accordance with further aspects of this particular embodiment, submitting, to the target server, the one or more authentication credentials via the second flow may include inputting one or more random credentials into the authentication form; initiating the submission of the one or more random credentials via the authentication form; detecting the initiation of the submission of the one or more random credentials to the target server via the first flow; cancelling the submission of the one or more random credentials to the target server; replacing the one or more random credentials with the one or more authentication credentials in the authentication form; and submitting the authentication form to the target server.

In accordance with additional aspects of this particular embodiment, the first flow may be associated with a traditional process for submitting the one or more authentication credentials to the target server.

In accordance with other aspects of this particular embodiment, the second flow may be associated with an alternative process for submitting the one or more authentication credentials to the target server.

In accordance with further aspects of this particular embodiment, an authentication request result may be received from the target server.

In accordance with additional aspects of this particular embodiment, the authentication request result may include at least one of an authentication cookie, a redirect instruction, and a document.

In accordance with other aspects of this particular embodiment, the authentication request result may be injected into a requesting document.

In accordance with further aspects of this particular embodiment, a home page associated with the authentication form may be displayed.

In another particular embodiment, the techniques may be realized as an article of manufacture for securing authentication credentials on a client device, the article of manufacture comprising: at least one non-transitory processor readable medium; and instructions stored on the at least one medium; wherein the instructions are configured to be readable from the at least one medium by at least one processor and thereby cause the at least one processor to operate so as to: detect, on the client device, display of an authentication form in a browser window associated with a first flow to a target server; access, on the client device, one or more authentication credentials associated with a user of the client device; and submit, to the target server, the one or more authentication credentials via a second flow to the target server.

In accordance with other aspects of this particular embodiment, the one or more authentication credentials may include at least one of a username and a password.

In another particular embodiment, the techniques may be realized as a system for securing authentication credentials on a client device comprising: one or more processors communicatively coupled to a network, wherein the one or more processors are configured to: detect, on the client device, display of an authentication form in a browser window associated with a first flow to a target server; access, on the client device, one or more authentication credentials associated with a user of the client device; and submit, to the target server, the one or more authentication credentials via a second flow to the target server.

In accordance with other aspects of this particular embodiment, the one or more authentication credentials may include at least one of a username and a password.

In accordance with further aspects of this particular embodiment, the one or more processors may be configured to detect display of the authentication form by identifying one or more authentication fields within the authentication form.

In accordance with additional aspects of this particular embodiment, the one or more processors may be configured to access the one or more authentication credentials by accessing a pre-established password vault associated with the user.

In accordance with other aspects of this particular embodiment, the one or more processors may be configured to access the one or more authentication credentials by receiving the one or more authentication credentials via a secure window.

In accordance with further aspects of this particular embodiment, the one or more processors may be configured to submit, to the target server, the one or more authentication credentials via the second flow by inputting one or more random credentials into the authentication form; initiating the submission of the one or more random credentials via the authentication form; detecting the initiation of the submission of the one or more random credentials to the target server via the first flow; cancelling the submission of the one or more random credentials to the target server; replacing the one or more random credentials with the one or more authentication credentials in the authentication form; and submitting the authentication form to the target server.

The present disclosure will now be described in more detail with reference to embodiments thereof as shown in the accompanying drawings. While the present disclosure is described below with reference to embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
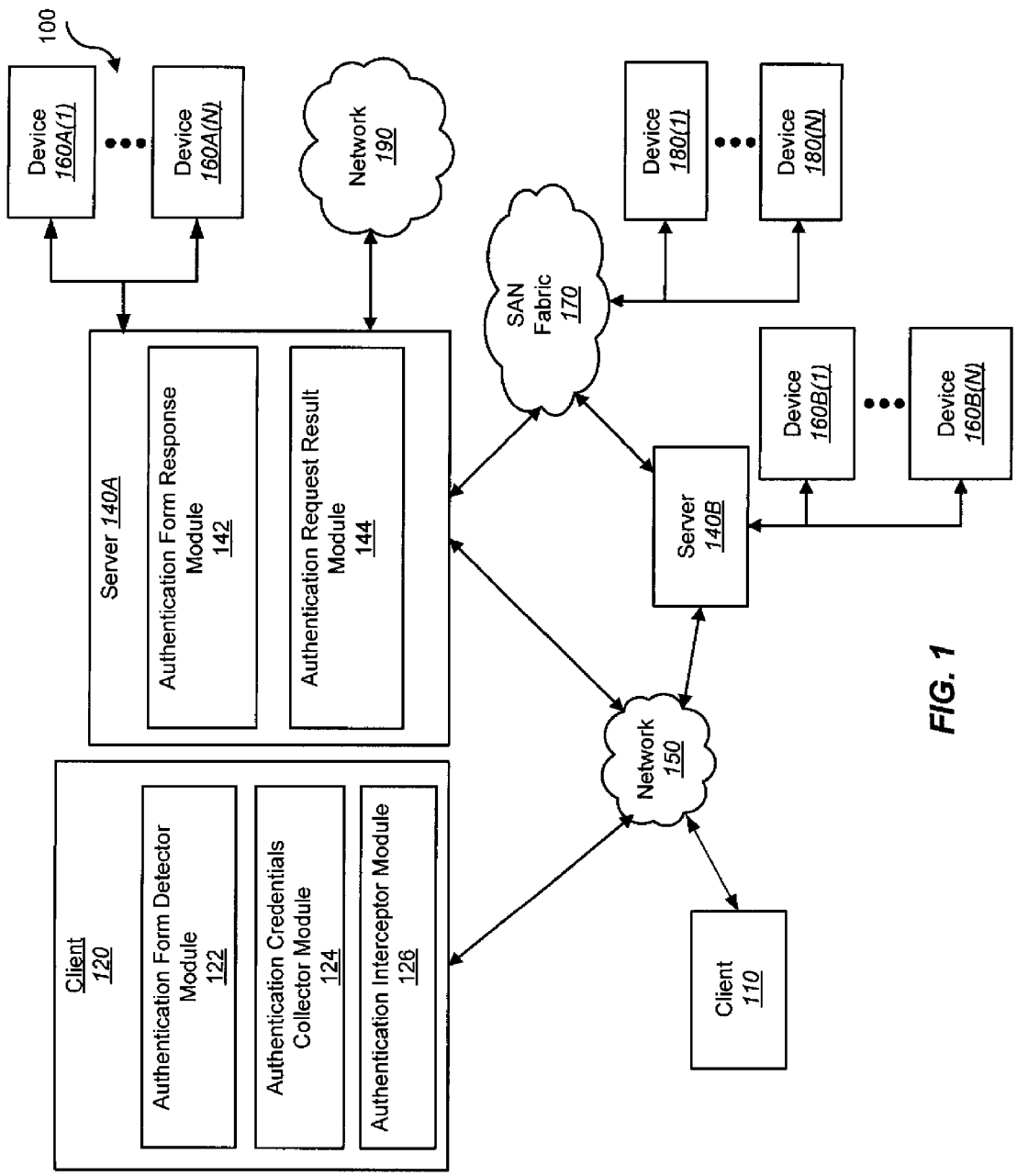
FIG. 1 shows a block diagram depicting a network architecture containing a platform for securing authentication credentials on a client device during submission in browser-based cloud applications in accordance with an embodiment of the present disclosure.

Currently, most internet security mechanisms (e.g., encryption techniques) may be designed to protect authentication credentials (e.g., username, password) during transmission to a server (e.g., a target web server) across the Internet. These internet security mechanisms, however, may fail to provide any protection against third party applications (e.g., key loggers, hooks) that seek to surreptitiously gain access to authentication credentials while an online user enters the authentication credentials into a webpage (e.g., an authentication form) of a web interface (e.g., a web interface that provides access to one or more cloud applications) using a web browser operating on a client device (e.g., personal computer). As a result, authentication credentials located on the client device may be easily accessed.

In one embodiment, certain techniques for securing authentication credentials on a client device during submission in browser-based cloud applications are provided. In such an embodiment, a secure authentication system may operate on a client device to ensure that authentication credentials that are being submitted to a target server via a web browser are protected while on the client device. The secure authentication system may provide such protection by providing an alternate flow (e.g., a flow that bypasses the traditional browser flow and keeps the authentication credentials invisible to other browser plug-ins) for communicating authentication credentials to the target server.

The security features of the secure authentication system may be initiated when display of an authentication form (e.g., a webpage that requests a user to provide authentication credentials) in a browser window is detected on the client device. In certain embodiments, the secure authentication system may detect the display of an authentication form by identifying one or more authentication fields (e.g., a username field, a password field), a submit button, or a combination of both within the authentication form.

Once display of the authentication form is detected, the secure authentication system may access a user's authentication credentials. In one embodiment, the authentication credentials may be accessed in a password vault (e.g., a mechanism configured to securely store usernames and passwords associated with a user) that was previously established by the user. In another embodiment, the authentication credentials may be accessed by providing the user with a secure window for entering the authentication credentials. The secure window may include a non-browser window that is separate from the browser window that is displaying the authentication form.

The secure authentication system may then enter random credentials (e.g., a set of random characters that are similar in appearance to the authentication credentials) into the authentication form displayed on the browser window. The process of submitting the random credentials to the target server via the authentication form (e.g., via the traditional browser flow) may be initiated.

The secure authentication system may then detect and cancel the submission of the random credentials via the authentication form (e.g., cancel the authentication request). Instead of allowing the random credentials to be submitted to the target server, the secure authentication system may replace the random credentials with the authentication credentials in the authentication form. The secure authentication system may then submit the authentication credentials to the target server (e.g., via the alternative flow).

Alternatively, the secure authentication system may parse webpage associated with the authentication form to determine where the webpage would send authentication credentials. The secure authentication system may then mimic the behavior of the webpage to submit the authentication credentials to the target server.

If authentication is successful, the secure authentication system may receive an authentication request result (e.g., an authentication cookie, a redirect instruction, a web document) from the target server. The authentication request result may be injected into a requesting web document to gain access to a homepage of the web interface.

Accordingly, the secure authentication system may effectively protect authentication credentials by not allowing the authentication credentials to be typed into the authentication form (e.g., a traditional browser flow) thereby preventing a third party application from accessing the authentication credentials while or after they are entered.

FIG. 1 shows a block diagram depicting a network architecture 100 containing a platform for securing authentication credentials on a client device during submission in browser-based cloud applications in accordance with an embodiment of the present disclosure. FIG. 1 is a simplified view of network architecture 100, which may include additional elements that are not depicted. Network architecture 100 may contain client 110, client 120, server 140A, as well as server 140B (one or more of which may be implemented using computer system 200 shown in FIG. 2). Client 110, client 120, server 140A, and server 140B may be communicatively coupled to a network 150. Server 140A may be communicatively coupled to storage devices 160A(1)-(N), and server 140B may be communicatively coupled to storage devices 160B(1)-(N). Server 140A may contain one or more modules for securing authentication credentials on a client device during submission in browser-based cloud applications including an authentication form response module 142 and an authentication request result module 144. Server 140A and server 140B may be communicatively coupled to a SAN (Storage Area Network) fabric 170. SAN fabric 170 may support access to storage devices 180(1)-(N) by server 140A and server 140B, and by client 110 and client 120 via network 150. Server 140A may be communicatively coupled to network 190. Client 120 may contain one or more modules for securing authentication credentials on a client device during submission in browser-based cloud applications including an authentication form detector module 122, an authentication credentials collector module 124, and an authentication interceptor module 126.

Figure 2:
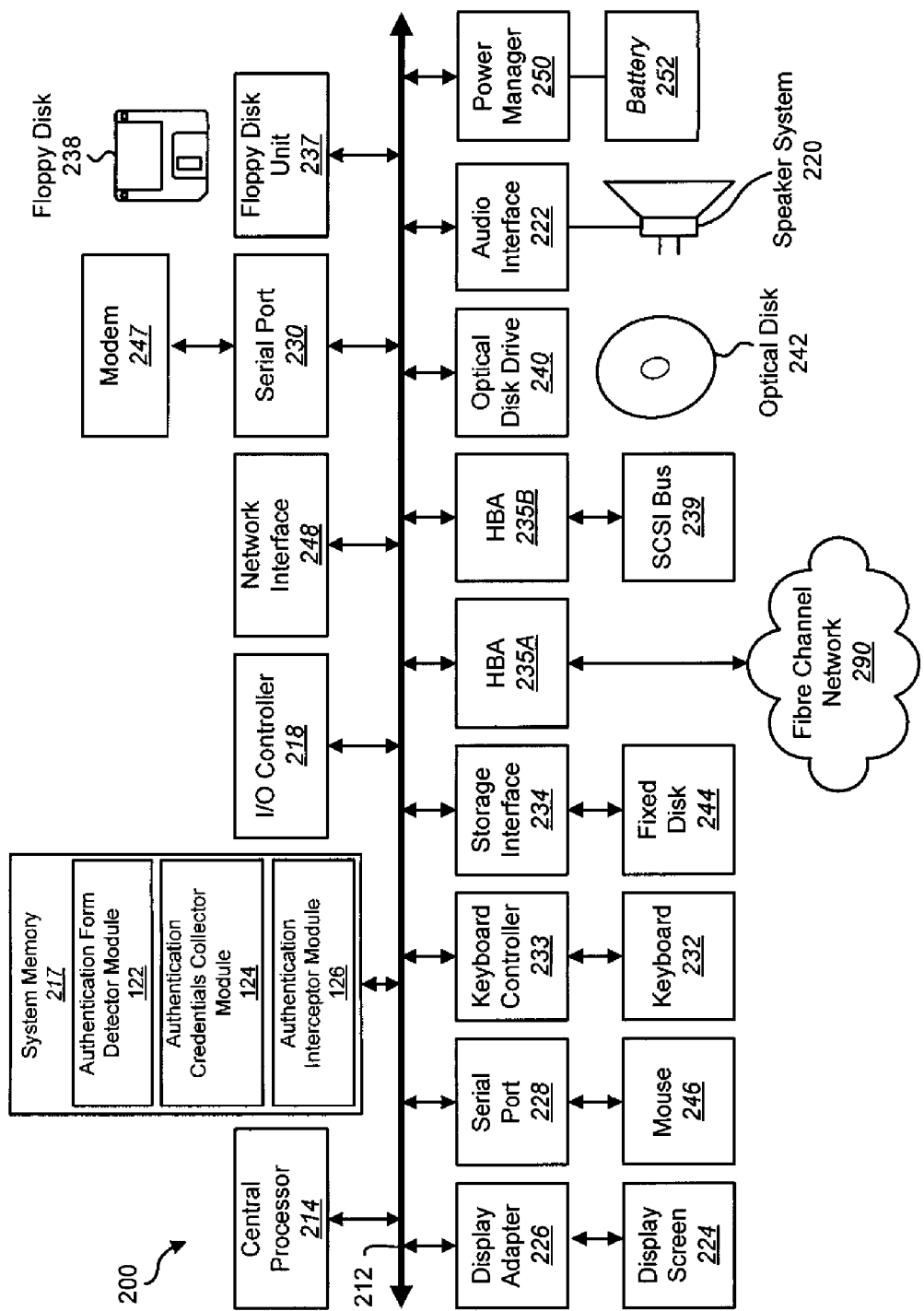
FIG. 2 depicts a block diagram of a computer system in accordance with an embodiment of the present disclosure.

With reference to computer system 200 of FIG. 2, modem 247, network interface 248, or some other method may be used to provide connectivity from one or more of client 110 and client 120 to network 150. Client 120 may be able to access information on server 140A or server 140B using, for example, a web browser or other client software. Such a client may allow client 120 to access data hosted by server 140A or server 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, client 120, server 140A, server 140B, and other devices communicatively coupled to networks 150 and 190. Networks 150 and 190 may further include one, or any number, of the types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to client 110, client 120, server 140A, or server 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup, replication, or archival purposes.

According to some embodiments, client 110 and client 120 may be a smartphone, PDA, desktop computer, a laptop computer, a server, another computer, or another device coupled via a wireless or wired connection to network 150. Client 110 and client 120 may receive data from user input, a database, a file, a web service, and/or an application programming interface.

Server 140A and server 140B may be web servers, application servers, archival platforms, backup servers, backend servers, network storage devices, media servers, email servers, document management platforms, enterprise search servers, or other devices communicatively coupled to network 150. Server 140A and server 140B may utilize one of storage devices 160A(1)-(N), 160B(1)-(N), and/or 180(1)-(N) for the storage of application data, replication data, backup data, or other data. Server 140A and server 140E may be hosts, such as an application server, which may process data traveling between client 110 and client 120 and a backup platform, a backup process, and/or storage. According to some embodiments, server 140A and server 140B may be platforms used for backing up and/or archiving data.

Authentication form detector module 122, authentication credentials collector module 124, authentication interceptor module 126, authentication form response module 142, and authentication request result module 144 are discussed in further detail below.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, authentication form detector module 122, authentication credentials collector module 124, and authentication interceptor module 126 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
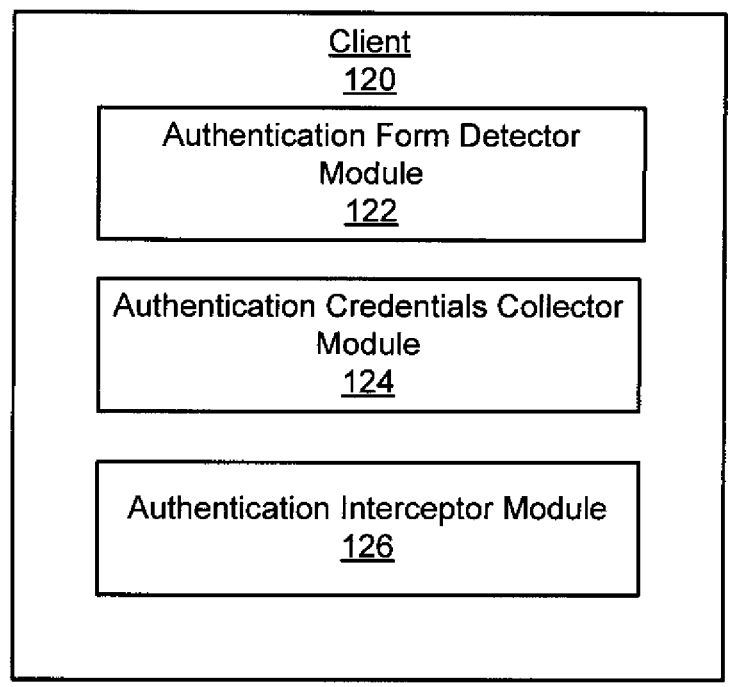
FIG. 3 shows modules of a client in accordance with an embodiment of the present disclosure.

FIG. 3 shows modules of a client 120 in accordance with an embodiment of the present disclosure. As illustrated, the client 120 may contain one or more components including an authentication form detector module 122, an authentication credentials collector module 124, and an authentication interceptor module 126.

The description below describes network elements, computers, and/or components of a system and method for securing authentication credentials on a client device during submission in browser-based cloud applications that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

A user may attempt to access one or more applications (e.g., one or more cloud applications) via a web interface using a web browser operating on a client device (e.g., client 120). After entering an Uniform Resource Locator (URL) associated with the web interface, an authentication form may be received and displayed in a browser window of the web browser. An authentication form may include any webpage that requests a user to provide (e.g., enter) authentication credentials.

Authentication form detector module 122 may be configured to detect display of the authentication form in the browser window. In one embodiment, the authentication form detector module 122 may detect the display of an authentication form by identifying one or more authentication fields, a submit button, or a combination of both within the authentication form. For example, the authentication form detector module 122 may detect the display of an authentication form by identifying a username field and a submit button within the authentication form. In another example, the authentication form detector module 122 may detect the display of an authentication form by identifying a username field and a password field within the authentication form. In yet another example, the authentication form detector module 122 may detect the display of an authentication form by identifying a username field, a password field, and a submit button within the authentication form.

In another embodiment, the authentication form detector module 122 may detect the display of an authentication form by inspecting the URL navigated to identify the term "login." In another embodiment, the authentication form detector module 122 may detect the display of an authentication form by identifying one or more signatures (e.g., stored externally) of one or more authentication forms. In yet another embodiment, the authentication form detector module 122 may detect the display of an authentication form in response to a user input. For example, a user may navigate to an authentication form and activate a user input (e.g., click a button) to indicate the display of the authentication form.

The authentication credentials collector module 124 may be configured to access the user's authentication credentials once the display of an authentication form is detected. In one embodiment, the authentication credentials collector module 124 may access the authentication credentials in a password vault (e.g., a mechanism configured to securely store usernames and passwords associated with a user) that was previously established by the user. In another embodiment, the authentication credentials collector module 124 may access the authentication credentials by providing the user with a secure window for entering the authentication credentials. The secure window may include a non-browser window that is separate from the browser window that is displaying the authentication form. For example, the secure window may include a private desktop window that is not susceptible to third party applications (e.g., key loggers, screen-shot takers).

The authentication credentials collector module 124 may then enter random credentials into the authentication form displayed in the browser window. Random credentials may include a set of random characters that are similar in appearance to the authentication credentials. The authentication credentials collector module 124 may then initiate the process of submission of the authentication form with the random credentials to a target server (e.g., server 140A).

The authentication interceptor module 126 may be configured to detect standard browser navigational events. Accordingly, the authentication interceptor module 126 may detect the submission of the random credentials via the authentication form. Once submission of the random credentials is detected, the authentication interceptor module 126 may cancel the submission by canceling an authentication request. Instead of allowing the random credentials to be submitted to the target server, the authentication interceptor module 126 may replace the random credentials with the authentication credentials in the authentication form. The authentication interceptor module 126 may then open a separate channel (e.g., a Secure Sockets Layer (SSL)/Transport Layer Security (TLS) channel) and submit the authentication credentials to the target server via the separate channel.

Alternatively, the authentication interceptor module 126 may parse the webpage associated with the authentication form to determine where the webpage would send authentication credentials. The authentication interceptor module 126 may then mimic the behavior of the webpage to submit the authentication credentials to the target server via the separate channel.

If authentication is successful, the authentication interceptor module 126 may receive an authentication request result (e.g., an authentication cookie, a redirect instruction, a web document) from the target server. The authentication interceptor module 126 may then inject the authentication request result into the requesting web document to gain access to a homepage of the web interface.

Figure 4:
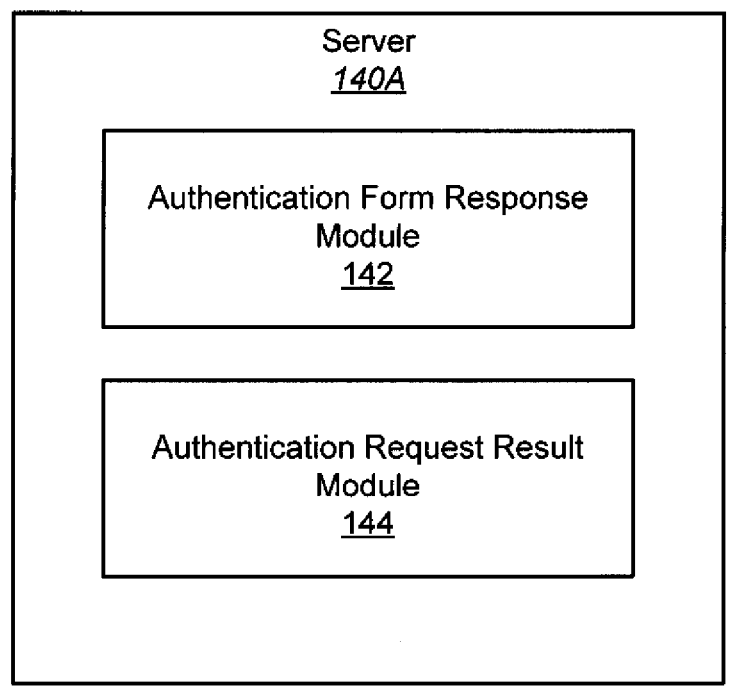
FIG. 4 shows modules of a server in accordance with an embodiment of the present disclosure.

FIG. 4 shows modules of a server 140A in accordance with an embodiment of the present disclosure. As illustrated, the server 140A may contain one or more components including an authentication form response module 142 and an authentication request result module 144.

The description below describes network elements, computers, and/or components of a system and method for securing authentication credentials on a client device during submission in browser-based cloud applications that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As previously described, a user may attempt to access one or more applications (e.g., one or more cloud applications) via a web interface using a web browser operating on a client device (e.g., client 120).

The authentication form response module 142 may be configured to transmit an authentication form to the client device after receiving a request for the web interface from the client device.

The authentication request result module 144 may be configured to receive the authentication credentials from the client device. After comparing the authentication credentials to previously stored authentication credentials, the authentication request result module 144 may generate an authentication request result. If authentication is not successful, the authentication request result may indicate an authentication failure. If, however, authentication is successful, the authentication request result may include any, or a combination, of an authentication cookie, a redirect instruction, and another web document (e.g., using AJAX). The authentication request result module 144 may then transmit the authentication request result to the client device.

Figure 5:
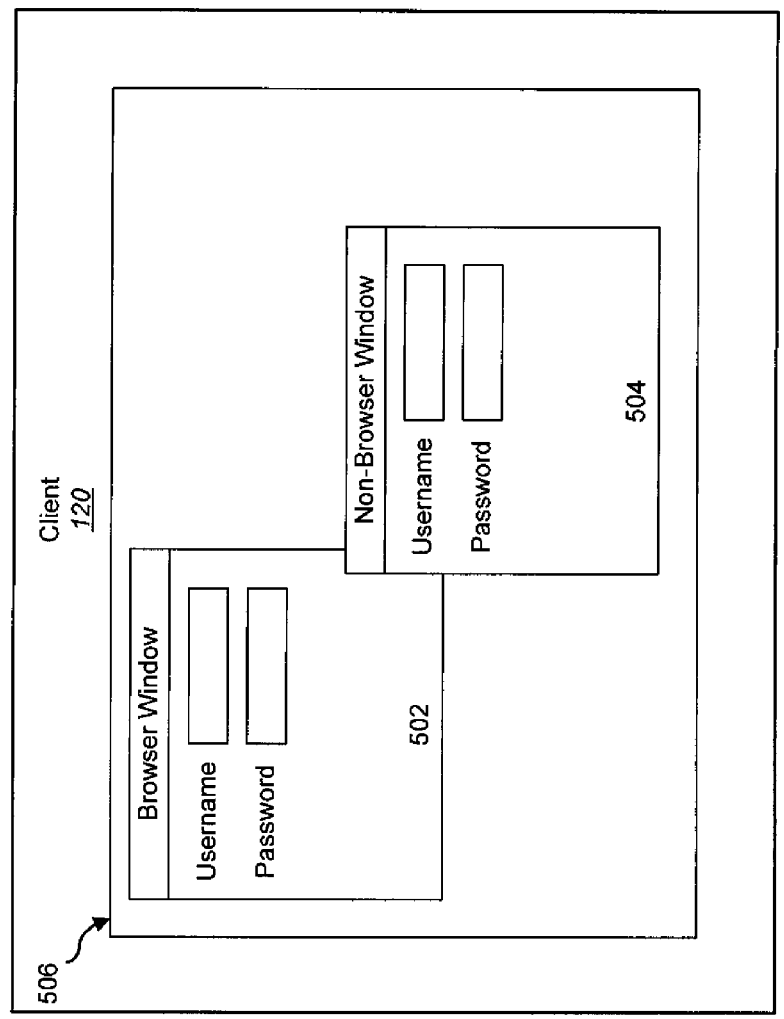
FIG. 5 shows a secure window on a client in accordance with an embodiment of the present disclosure.

FIG. 5 shows a secure window on a client in accordance with an embodiment of the present disclosure. As illustrated in FIG. 5, a client device (e.g., client 120) may include a display screen 506. A user of the client device may attempt to access one or more applications (e.g., one or more cloud applications) via a web interface using a web browser operating on the client device. Accordingly, the user may enter an URL into a browser window 502 and an authentication form may be received and displayed in the browser window 502.

The secure authentication system operating on the client device may then access authentication credentials associated the user. In one embodiment, the secure authentication system may access the authentication credentials by providing the user with a secure, non-browser window 504 for entering the authentication credentials. As illustrated, the non-browser window 504 may be separate from the browser window 502 that is displaying the authentication form. For example, the non-browser window 504 may include a private desktop window that is not susceptible to third party applications (e.g., key loggers, screen-shot takers).

Figure 6:
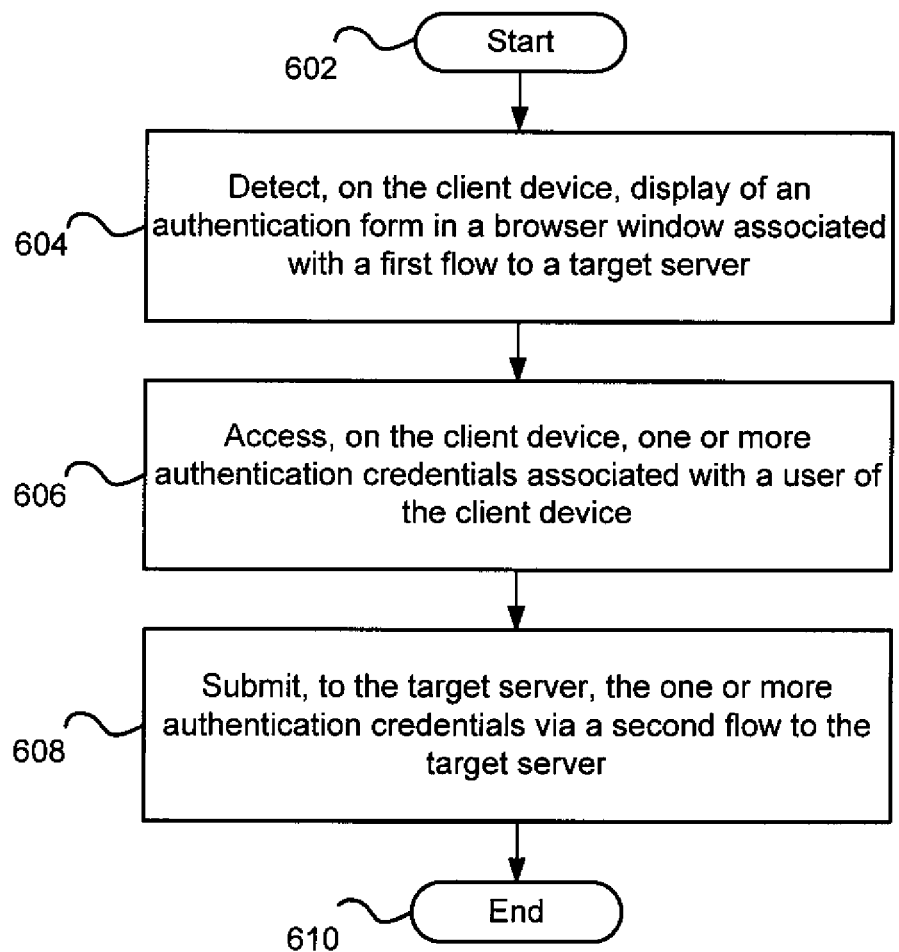
FIG. 6 depicts a method for securing authentication credentials on a client device during submission in browser-based cloud applications in accordance with an embodiment of the present disclosure.

FIG. 6 depicts a method for securing authentication credentials on a client device during submission in browser-based cloud applications in accordance with an embodiment of the present disclosure. The method 600 may begin at block 602.

At block 604, display of an authentication form in a browser window associated with a first flow to a target server is detected on the client device. In certain embodiments, the authentication form detector module 122 may detect the display of an authentication form by identifying one or more authentication fields, a submit button, or a combination of both within the authentication form. For example, the authentication form detector module 122 may detect the display of an authentication form by identifying a username field and a submit button within the authentication form. In another example, the authentication form detector module 122 may detect the display of an authentication form by identifying a username field and a password field within the authentication form. In yet another example, the authentication form detector module 122 may detect the display of an authentication form by identifying a username field, a password field, and a submit button within the authentication form.

At block 606, one or more authentication credentials associated with a user of the client device is accessed on the client device. In one embodiment, the authentication credentials collector module 124 may access the authentication credentials in a password vault (e.g., a mechanism configured to securely store usernames and passwords associated with a user) that was previously established by the user. In another embodiment, the authentication credentials collector module 124 may access the authentication credentials by providing the user with a secure window for entering the authentication credentials.

At block 608, the one or more authentication credentials are submitted to the target server via a second flow to the target server. For example, the second flow may include a flow that bypasses the traditional browser flow and keeps the authentication credentials invisible to other browser plug-ins.

At block 610, the method 600 may end.

At this point it should be noted that securing authentication credentials on a client device during submission in browser-based cloud applications in accordance with the present disclosure as described above may involve the processing of input data and the generation of output data to some extent. This input data processing and output data generation may be implemented in hardware or software. For example, specific electronic components may be employed in an authentication interceptor module or similar or related circuitry for implementing the functions associated with securing authentication credentials on a client device during submission in browser-based cloud applications in accordance with the present disclosure as described above. Alternatively, one or more processors operating in accordance with instructions may implement the functions associated with securing authentication credentials on a client device during submission in browser-based cloud applications in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for securing authentication credentials on a client device comprising:
   detecting, on the client device, display of an authentication form in a browser window associated with a first flow to a target server, the authentication form requiring input of one or more authentication credentials associated with a user of the client device in order to grant to the client device access to one or more resources;
   accessing, on the client device, data corresponding to the one or more authentication credentials required by the authentication form;
   submitting, to the target server, the same one or more authentication credentials required by the authentication form associated with the first flow via a second flow to the target server in order to bypass the first flow without providing the authentication credentials via the first flow, wherein the second flow is not associated with the browser window such that the submission of the authentication credentials is not subject to interception by one or more browser plug-ins; and
   accessing, on the client device, the one or more resources without providing the one or more authentication credentials to the authentication form in the browser window associated with the first flow.

2. The method of claim 1, wherein the one or more authentication credentials comprise at least one of a username and a password.

3. The method of claim 1, wherein detecting display of the authentication form comprises identifying one or more authentication fields within the authentication form.

4. The method of claim 1, wherein accessing the one or more authentication credentials comprises accessing a pre-established password vault associated with the user.

5. The method of claim 1, wherein accessing the one or more authentication credentials comprises receiving the one or more authentication credentials via a secure window that is distinct from the browser window.

6. The method of claim 1, wherein the method further comprises:
   inputting one or more random credentials into the authentication form in the browser window associated with the first flow;
   initiating the submission of the one or more random credentials via the authentication form such that the submission of the random credentials is subject to interception by one or more browser plug-ins;
   detecting the initiation of the submission of the one or more random credentials to the target server via the first flow; and
   cancelling the submission of the one or more random credentials to the target server.

7. The method of claim 1, wherein the first flow is associated with a traditional process for submitting the one or more authentication credentials to the target server.

8. The method of claim 1, wherein the second flow is associated with an alternative process for submitting the one or more authentication credentials to the target server.

9. The method of claim 1, further comprising receiving, from the target server, an authentication request result.

10. The method of claim 9, wherein the authentication request result comprises at least one of an authentication cookie, a redirect instruction, and a document.

11. The method of claim 9, further comprising injecting the authentication request result into a requesting document.

12. The method of claim 1, further comprising displaying a home page associated with the one or more resources.

13. An article of manufacture for securing authentication credentials on a client device, the article of manufacture comprising:
   at least one non-transitory processor readable medium; and
   instructions stored on the at least one medium;
   wherein the instructions are configured to be readable from the at least one medium by at least one processor and thereby cause the at least one processor to operate so as to:
      detect, on the client device, display of an authentication form in a browser window associated with a first flow to a target server, the authentication form requiring input of one or more authentication credentials associated with a user of the client device in order to grant to the client device access to one or more resources;
      access, on the client device, data corresponding to the one or more authentication credentials required by the authentication form;
      submit, to the target server, the same one or more authentication credentials required by the authentication form associated with the first flow via a second flow to the target server in order to bypass the first flow without providing the authentication credentials via the first flow, wherein the second flow is not associated with the browser window such that the submission of the authentication credentials is not subject to interception by one or more browser plug-ins; and access, on the client device, the one or more resources without providing the one or more authentication credentials to the authentication form in the browser window associated with the first flow.

14. The article of manufacture of claim 13, wherein the one or more authentication credentials comprise at least one of a username and a password.

15. A system for securing authentication credentials on a client device comprising:

one or more processors communicatively coupled to a network, wherein the one or more processors are configured to:

detect, on the client device, display of an authentication form in a browser window associated with a first flow to a target server, the authentication form requiring input of one or more authentication credentials associated with a user of the client device in order to grant to the client device access to one or more resources;

access, on the client device, data corresponding to the one or more authentication credentials required by the authentication form;

submit, to the target server, the same one or more authentication credentials required by the authentication form associated with the first flow via a second flow to the target server in order to bypass the first flow without providing the authentication credentials via the first flow, wherein the second flow is not associated with the browser window such that the submission of the authentication credentials is not subject to interception by one or more browser plug-ins; and access, on the client device, the one or more resources without providing the one or more authentication credentials to the authentication form in the browser window associated with the first flow.

16. The system of claim 15, wherein the one or more authentication credentials comprise at least one of a username and a password.

17. The system of claim 15, wherein the one or more processors are configured to detect display of the authentication form by identifying one or more authentication fields within the authentication form.

18. The system of claim 15, wherein the one or more processors are configured to access the one or more authentication credentials by accessing a pre-established password vault associated with the user.

19. The system of claim 15, wherein the one or more processors are configured to access the one or more authentication credentials by receiving the one or more authentication credentials via a secure window distinct from the browser window.

20. The system of claim 15, wherein the one or more processors are configured to submit, to the target server, the one or more authentication credentials via the second flow by:

inputting one or more random credentials into the authentication form in the browser window associated with the first flow;

initiating the submission of the one or more random credentials via the authentication form such that the submission of the random credentials is subject to interception by one or more browser plug-ins;

detecting the initiation of the submission of the one or more random credentials to the target server via the first flow; and cancelling the submission of the one or more random credentials to the target server.

* * * * *